UNITED STATES PATENT OFFICE.

ROBERT A. ARCHIBALD, OF OAKLAND, CALIFORNIA.

LEUCOCYTIC EXTRACT AND METHOD OF MAKING THE SAME.

1,171,299.     Specification of Letters Patent.     Patented Feb. 8, 1916.

No Drawing.     Application filed July 13, 1914. Serial No. 850,591.

*To all whom it may concern:*

Be it known that I, ROBERT A. ARCHIBALD, a citizen of the United States, and a resident of Oakland, county of Alameda, and State of California, have invented a certain new and useful Leucocytic Extract and Method of Making the Same, of which the following is a specification.

The invention relates to leucocytic extract.

The object of the invention is to provide a liquid or extract which when injected under the skin of a person having an infection or an infectious disorder or malady will produce a marked curative effect on the disorder or malady or remove the infection.

Another object of the invention is to provide a method of making such extract.

The invention possesses innumerable advantages in the treatment and cure of infections, but I am not sufficiently certain as to the effects produced in the body by the inoculation of the extract to make an absolute statement as to the biological or bacteriological changes which occur after the inoculation. I am of the opinion that the extract in some manner greatly increases the number of or the activity or capacity of the leucocytes or white corpuscles of the blood. The leucocytes prey upon and take into their substance bacteria and other micro-organisms within the blood and tissues, and if their number or activity is increased, they operate to remove the infection. Whatever the action of the extract is, I know from experiment that it is extremely useful in the treatment of infections.

The extract is not necessarily limited in its production to the extract process herein described, but may be produced by modifications of such process. The extract is made from the blood of an animal such as the ox, hog, sheep, horse, dog or other domestic animal, the blood being in a normal condition, so that the leucocytes are normal and free from the influence of infection or inflammation. The blood is preferably obtained from the jugular vein of an animal by inserting a cannula into a cleaned and disinfected area, or may be obtained at a slaughter house. The blood from the animal is allowed to flow directly into sterile flasks which contain a sufficient amount of one per cent. sodium citrate solution to prevent the blood from coagulating. When the blood arrives at the laboratory more one per cent. sodium citrate solution is added in varying amounts to further dilute the blood for the purpose of facilitating the precipitation of the blood corpuscles. The amount of sodium citrate added at this time depends upon the species of animal from which the blood was obtained. To this mixture is added a five-tenths of one per cent. acetic acid solution or other equivalent solution, for the purpose of breaking up and destroying the red blood corpuscles. The amount of the acetic acid solution added depends upon the character of blood being treated. The mixture is then centrifuged in a high powered centrifuge to precipitate the white blood corpuscles. The supernatant fluid which consists of the sodium citrate solution, the acetic acid solution and blood serum, is siphoned off and discarded. The sediment so obtained which is very rich in normal leucocytes is washed several times with physiological salt solution for the purpose of getting rid of the debris, acid and hemoglobin, the result of the disintegration of the red blood corpuscles.

The washed leucocytic sediment is ground with quartz sand for the purpose of breaking up the masses of leucocytes and to assist in disintegrating the leucocytes themselves. This permits auto-digestion to progress with greater ease and rapidity and the soluble substances contained within the cell walls of leucocytes are more easily extracted during the process of auto-digestion. The acidity is then determined by titration, using phenolphthalein, litmus or other material, as an indicator. Sufficient one tenth normal sodium hydrate solution is added to this emulsion to neutralize the acidity produced previously by the addition of the acetic acid solution. To this sediment distilled water is added in the proportion of about four volumes of water to one of sediment for the purpose of dilution. The mixture is then exposed to a temperature of about 58° C. for approximately one hour for the purpose of destroying any antiferments it may contain. It is then placed in an incubator and maintained at a temperature of about 37° C., until autodigestion, or lysis of the leucocytes is complete. After the leucocytes have become broken up by reason of this digestion, and the protoplasm has been liberated, the mixture is centrifuged, the supernatent fluid or extract carefully decanted, and sufficient trikresol or other preservative added to it for preservative purposes. It is then sterilized by exposure to a temperature of 58° C. for one hour.

Each lot of extract is carefully examined bacteriologically and biologically to determine if it is sterile and its ability to produce certain definite blood changes is determined by the inoculation of definite quantities into experimental animals such as rabbits and guinea pigs.

The effect of the extract, when injected subcutaneously, is to increase the number of leucocytes and especially the polymophonuclear leucocytes which are believed to be the most active of all of the white blood cells in the control of infectious diseases and other pathological conditions.

I claim:

1. An extract obtained from the liberated protoplasm of digested normal leucocytes in permanent solution and possessing the characteristic when injected parenterally of stimulating the production of a leucocytosis and increasing the activity of the individual leucocytes.

2. An extract in soluble form neutral in reaction which is obtained from the liberated protoplasm of digested normal leucocytes in permanent solution and possessing the characteristic when injected parenterally of stimulating the production of a leucocytosis and increasing the activity of the individual leucocytes.

3. The process of preparing leucocytic extract, which consists in separating the normal leucocytes from blood, diluting the resultant mass, incubating the same to facilitate autodigestion or lysis, and separating the liquid content from the mass.

4. The method of preparing leucocytic extract, which consists in separating the normal leucocytes from the blood, adding distilled water to said leucocytes, heating the mixture to destroy any antiferments it may contain, incubating the mixture to facilitate autodigestion or lysis of the leucocytes, and then separating the liquid content from the mass.

5. The method of preparing leucocytic extract, which consists in adding a weak solution of acetic acid to blood, whereby the red blood corpuscles are destroyed, centrifuging the resultant mixture to precipitate the leucocytes, removing the supernatant fluid, emulsifying the precipitate, neutralizing the acidity thereof, adding distilled water to the emulsion, heating the mixture to destroy any antiferments that it may contain, incubating the mixture to facilitate autodigestion or lysis of the leucocytes, and removing the supernatant fluid.

6. The method of preparing leucocytic extract, which consists in adding a quantity of five-tenths of one per cent. acetic acid solution to blood for the purpose of destroying the red blood corpuscles, centrifuging the resultant mass to precipitate the leucocytes, removing the supernatant fluid, washing the precipitate with salt solution, emulsifying the washed precipitate, neutralizing its acidity with one-tenth normal sodium hydrate solution, adding distilled water to the mixture, exposing the mixture to a temperature of about 58° centigrade for approximately one hour to destroy any antiferments it may contain, incubating the mixture to facilitate autodigestion or lysis of the leucocytes, removing the supernatant fluid, sterilizing the fluid, and adding a preservative thereto.

In testimony whereof I have hereunto set my hand at San Francisco, California, this 8th day of July 1914.

ROBERT A. ARCHIBALD.

In presence of—
H. G. PROST,
M. LE CONTE.